United States Patent
Nelson

(10) Patent No.: US 8,449,010 B2
(45) Date of Patent: May 28, 2013

(54) SYSTEM AND METHOD FOR VEHICLE INSULATION

(75) Inventor: Chad Nelson, Rice Lake, WI (US)

(73) Assignee: FG Products, Inc., Rice Lake, WI (US)

( * ) Notice: Subject to any disclaimer, the term of this patent is extended or adjusted under 35 U.S.C. 154(b) by 97 days.

(21) Appl. No.: 13/087,234

(22) Filed: Apr. 14, 2011

(65) Prior Publication Data

US 2011/0254306 A1    Oct. 20, 2011

Related U.S. Application Data

(60) Provisional application No. 61/324,292, filed on Apr. 14, 2010.

(51) Int. Cl.
B62D 33/00    (2006.01)
(52) U.S. Cl.
USPC .......................... 296/39.3; 296/39.1; 296/214
(58) Field of Classification Search
USPC ................. 296/165, 168, 172, 173, 156, 176, 296/39.1, 39.3, 24.3, 214, 190.11, 190.08
See application file for complete search history.

(56) References Cited

U.S. PATENT DOCUMENTS

| | | | | |
|---|---|---|---|---|
| 2,167,557 A * | 7/1939 | Stout | ................................. | 52/69 |
| 2,803,491 A * | 8/1957 | Brown | ......................... | 296/39.2 |
| 2,911,253 A * | 11/1959 | Dewey | ......................... | 296/39.1 |
| 2,939,467 A * | 6/1960 | Meyer et al. | .................... | 52/2.13 |
| 3,898,779 A * | 8/1975 | Tracy | ............................. | 52/264 |
| 4,531,278 A * | 7/1985 | Boykin | ........................... | 29/469 |
| 4,877,281 A * | 10/1989 | Altmann | ...................... | 296/39.1 |
| 4,917,431 A * | 4/1990 | McDonald | .................... | 296/39.1 |
| 4,979,532 A * | 12/1990 | Johansson et al. | .............. | 135/97 |
| 5,706,846 A * | 1/1998 | Sutton | ........................... | 135/128 |
| 5,722,710 A * | 3/1998 | Falciani | ...................... | 296/39.1 |
| 5,806,909 A * | 9/1998 | Wise | ............................ | 296/39.1 |
| 6,070,925 A * | 6/2000 | Moldofsky | ................. | 296/26.08 |
| 6,142,550 A * | 11/2000 | Blyth et al. | ................. | 296/39.2 |
| 6,536,827 B2 * | 3/2003 | Oswald et al. | ............... | 296/39.2 |
| 6,595,568 B1 * | 7/2003 | Schroeder et al. | ........... | 296/39.1 |
| 6,619,717 B2 * | 9/2003 | Gardiner | ...................... | 296/39.2 |
| 6,971,707 B1 * | 12/2005 | Mullan | ......................... | 296/172 |
| 7,017,975 B2 * | 3/2006 | Parmer | ......................... | 296/157 |
| 7,178,857 B2 * | 2/2007 | Williams | ...................... | 296/173 |
| 8,186,917 B2 * | 5/2012 | Nelson et al. | ................ | 410/129 |
| 2005/0188649 A1* | 9/2005 | Hagen, Jr. | .................... | 52/782.1 |

(Continued)

OTHER PUBLICATIONS

Sub Zero Insulation & Refrigeration Technologies, LLC, Products, [Online], Retrieved from the Internet at http://www.subzerotechnologies.com/products.html on Mar. 23, 2011, 4 pages.

(Continued)

Primary Examiner — Lori Lyjak
(74) Attorney, Agent, or Firm — Oblon, Spivak, McClelland, Maier & Neustadt, L.L.P.

(57) ABSTRACT

According to one or more embodiments, an insulated liner structure for a vehicle includes a number of lightweight, potentially reusable insulated panels that may be attached to form an insulated enclosure, chamber, shell or other similar interior space. In some embodiments, the panels may be constructed with a lightweight single-layer or multi-layer core covered or surrounded by a flexible fabric skin. The panels may be shaped to substantially conform to the interior cargo area of a vehicle, and may include a floor panel, a roof panel, right and left wall panels, and a rear door panel, each of which may include multiple panels or structures.

20 Claims, 5 Drawing Sheets

U.S. PATENT DOCUMENTS

| | | | | |
|---|---|---|---|---|
| 2006/0055193 | A1* | 3/2006 | Colborne | 296/24.3 |
| 2006/0113813 | A1* | 6/2006 | Hicks | 296/26.01 |
| 2010/0065368 | A1* | 3/2010 | Tazian | 181/290 |
| 2010/0183398 | A1* | 7/2010 | Nelson et al. | 410/129 |
| 2010/0319742 | A1* | 12/2010 | Prusmack | 135/88.13 |
| 2012/0205943 | A1* | 8/2012 | Nelson et al. | 296/186.1 |

OTHER PUBLICATIONS

Midway Specialty Vehicles, LLC. Vehicle Systems Integrator, Sprinter Van Refrigeration Packages, [Online], Retrieved from the Internet at http://www.midwayspecialtyvehicles.com/commonvehiclesolutions/sprinter/sprinter_refrigeration_and_freeze_vans.htm on Apr. 4, 2011, 4 pages.

Van Shield, Insulated Truck, Trailer & Van body builders since 1913, [Online], Retrieved from the Internet at http://www.vanshield.com/sprinter.htm on Mar. 23, 2011, 2 pages.

VanLiner Technologies, Inc., Transferable ColdGuard Kit, [Online], Retrieved from the Internet at http://www.vanline.net/coldguard.html on Mar. 23, 2011, 9 pages.

Vgroup, Vantastec Conversions, Vantastec Refrigerated Panels, [Online], Retrieved from the Internet at http://thegroup.co.uk/conversions.html on Mar. 23, 2011, 3 pages.

Mobile Air Services, Inc., [Online], Retrieved from the Internet at http:/www.mobileairservices.com/literatureandlinks.html on Mar. 23, 2011, 4 pages.

Delta Waseca, Refrigerated, View Truck Specifications, [Online], Retrieved from the Internet at http://www.deltawaseca.com/Refrigerated.htm on Mar. 23, 2011, 5 pages.

Fleetco, Insulated Vans—Refrigerated Vans—Catering Vans, [Online], Retrieved from the Internet at http://www.fleetco-specialty.com/services/insulated-cargo-vans/ on Mar. 23, 2011, 3 pages.

New Van-Liner by Vanco LLC, date unknown, 2 pages.

Vanco Vanliner, Table of Features, Advantages and Benefits, [Online], Retrieved from the Internet at http://vancollc.net/fab.aspx on Mar. 23, 2011, 3 pages.

* cited by examiner

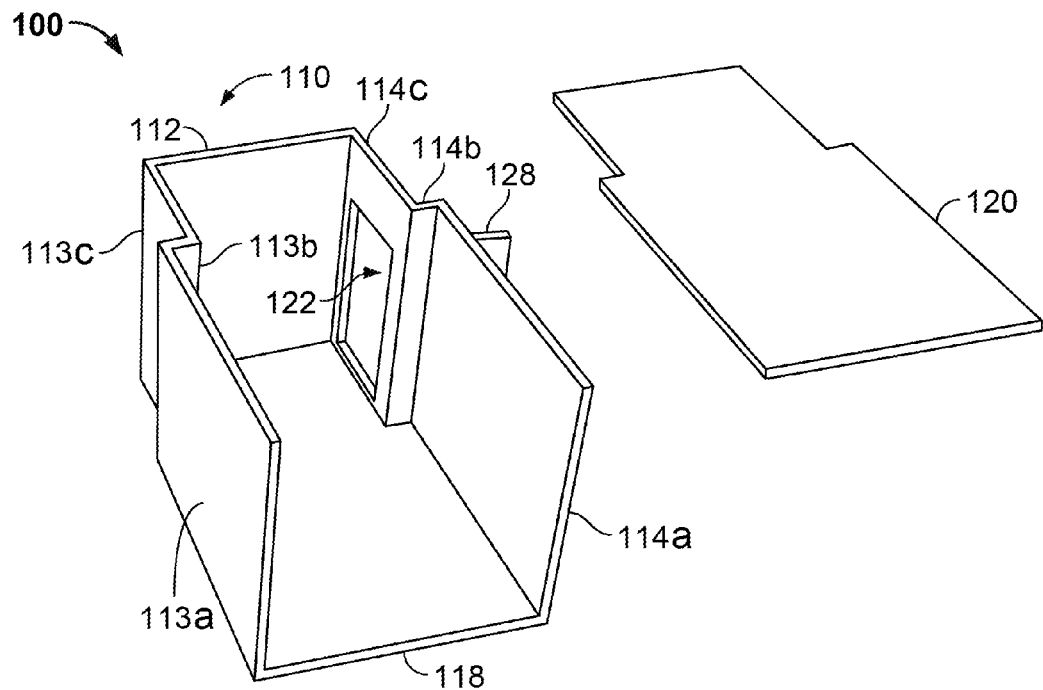
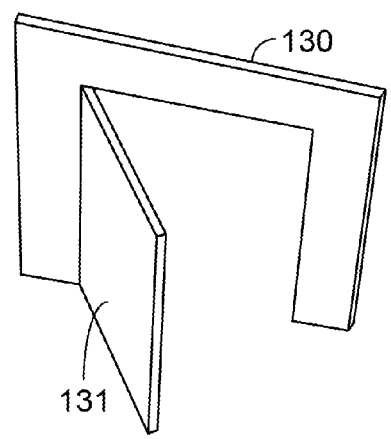
FIG. 1

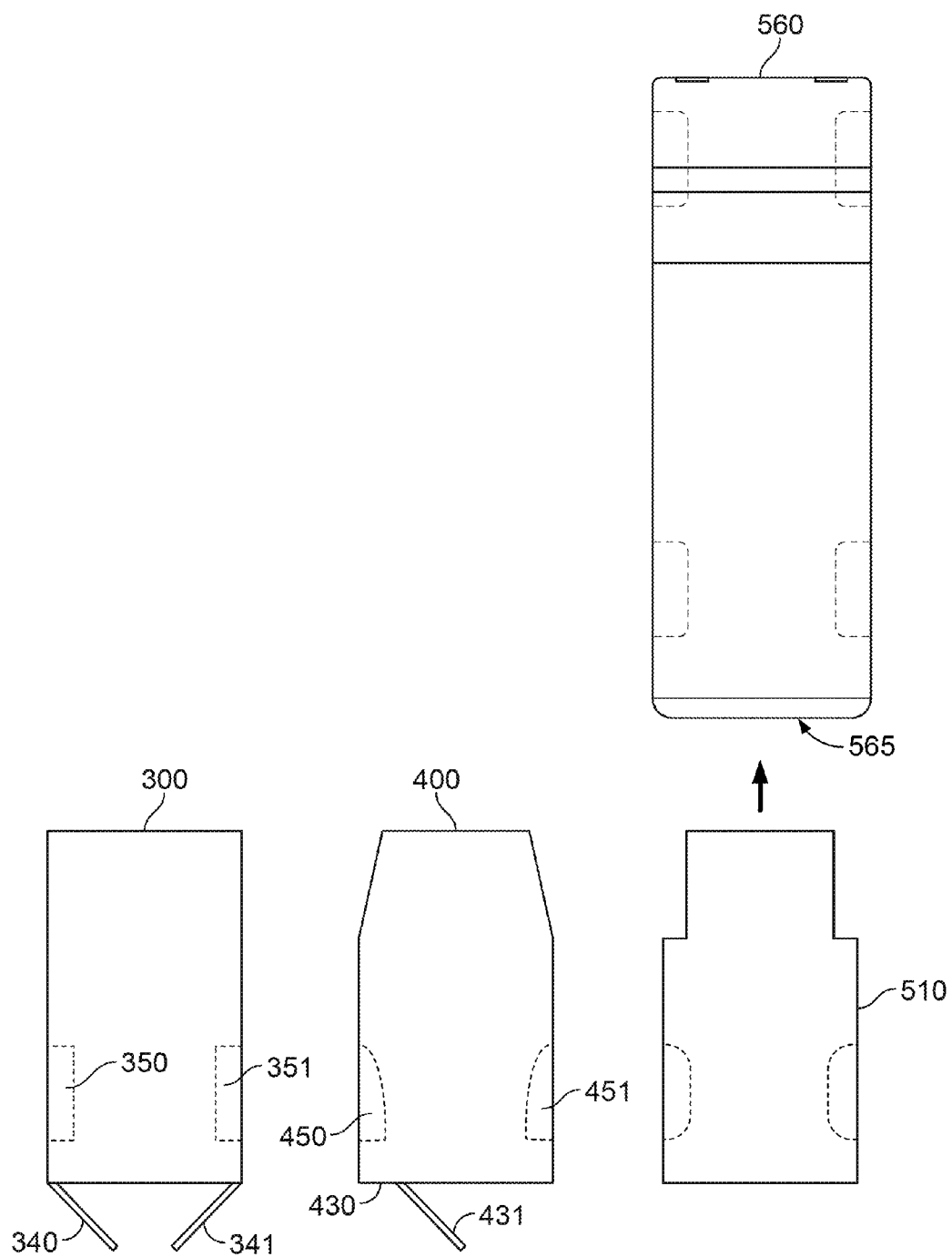

SYSTEM AND METHOD FOR VEHICLE INSULATION

CROSS REFERENCE TO RELATED APPLICATIONS

This application claims the benefit of U.S. Provisional Patent Application Ser. No. 61/324,292, entitled "System and Method for Vehicle Insulation," filed on Apr. 14, 2010, by Nelson.

BACKGROUND

Perishable items such as produce and meat are often transported in refrigerated trailers, railcars, or ocean-going containers that can be transported on ships, trains or trucks. Such cargo transport devices are typically equipped with a refrigeration unit which conditions the air inside the cargo space, thereby maintaining desired temperatures and humidities during transportation or storage. Refrigerated trailers, railcars and containers are typically configured so as to enclose a single, large cargo space. Their refrigeration units will accordingly maintain the entire cargo space at the same temperature and humidity unless the cargo area is somehow divided.

In some cases, movable partitions and bulkheads having a specialized construction are used to permit the cargo space of trailers, rail cars, and containers to be readily divided into sections of varying sizes. Such bulkheads and partitions have been widely used to separate cargo areas for multi-temperature transport. The structure and configuration of partition and bulkhead systems differ somewhat depending on whether they are being deployed in a trailer, railcar, or container. Partitions currently used in refrigerated truck trailers typically extend from floor to ceiling and are generally comprised of modular wall sections. The modular sections are often mounted in channels or grooves on the trailer floor, held in place by friction, or otherwise mechanically fastened in place so as to compartmentalize trailers and truck bodies for multi-temperature food distribution. The panels are used to divide the trailer or body both longitudinally, along the long axis of the trailer, and laterally, across the width of the trailer. Some partition systems include panels that can be readily removed and placed along the sidewall of the trailer when not in use.

Insulated bulkheads are panels that extend across the width of a trailer to form separate fore and aft cargo areas. Like partitions, insulated bulkheads allow a refrigerated hauler to carry two or more loads at different temperatures within the same trailer or cargo container. Bulkheads are optionally equipped with walk-through doors similar to those used in partitions to permit ingress to and egress from each conditioned cargo area. Due to the functional similarities between bulkheads and panels, the latter are sometimes referred to as bulkheads.

SUMMARY

Some embodiments are generally directed to an insulated liner structure that may be particularly useful for a vehicle cargo area, and a method for constructing such an insulating liner structure and installing it in a vehicle.

According to one or more embodiments, an insulated liner structure for a vehicle includes a number of lightweight, potentially reusable insulated panels that may be attached to form an insulated enclosure, chamber, shell or other similar interior space. In some embodiments, the panels may be constructed with a lightweight single-layer or multi-layer core covered or surrounded by a flexible fabric skin. The panels may be shaped to substantially conform to the interior cargo area of a vehicle, and may include a floor panel, a roof panel, right and left wall panels, and a rear door panel, each of which may include multiple panels or structures.

Further embodiments, alternatives and variations are also described herein or illustrated in the accompanying figures.

DESCRIPTION OF DRAWINGS

FIG. 1 is a perspective view diagram of components of an insulating liner structure for a vehicle cargo area as partially assembled, according to one embodiment as disclosed herein.

FIG. 3 is a top view diagram of an insulated liner structure in accordance with the general principals of FIG. 2.

FIG. 4 is a top view diagram of an insulated liner structure in accordance with the general principals of FIG. 1.

FIGS. 5 and 6 are top and side view diagrams, respectively, showing installation of an insulated liner structure in a vehicle.

DETAILED DESCRIPTION OF ILLUSTRATIVE EMBODIMENTS

Figure 2:
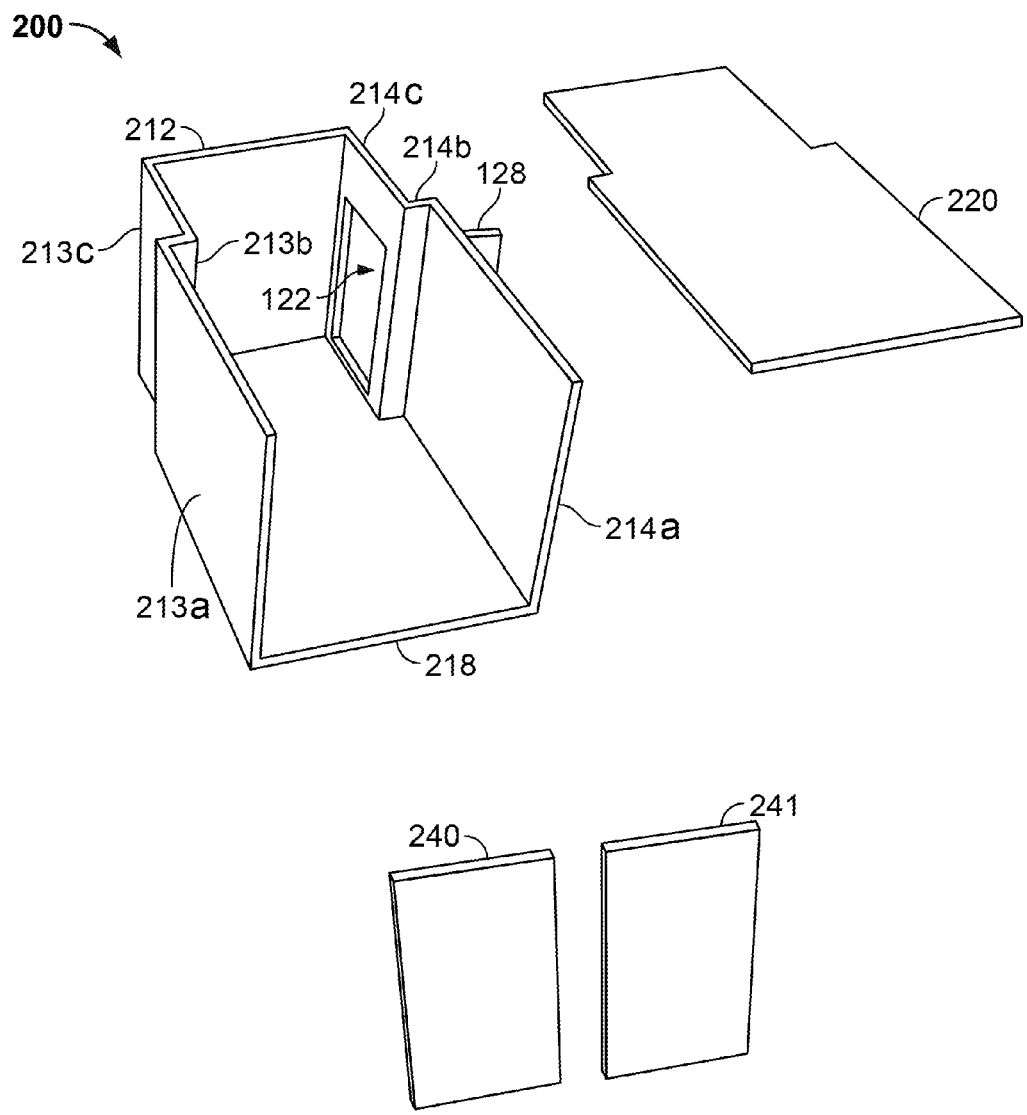
FIG. 2 is a perspective view diagram of another embodiment of an insulating liner structure for a vehicle cargo area, as partially assembled.

According to one or more embodiments, a vehicle insulation system is provided for retrofitting a vehicle with an interior lightweight insulating shell or liner structure, thereby forming an insulated vehicle chamber that can be useful for transporting perishables or for other purposes. The lightweight insulating shell or structure may be particularly useful for box trucks, vans, delivery trucks or small delivery vehicles, and other similar vehicles. The insulating shell or structure is preferably simple to install and easily removable, such that the vehicle can be used in its normal configuration with or without the insulating shell or structure, offering substantial flexibility and versatility.

In one or more embodiments, an insulating shell or structure is formed of lightweight, reusable vehicle insulation panels. The relative lightness of the panels may make them more economical to manufacture and ship, and may also maximize the carrying capacity of vehicles in which they are installed. The ease of installation and removal of the panels facilitates conversion of the vehicle between refrigeration and non-refrigeration use, and also may provide the ability to re-use the insulating shell or structure or panels thereof in different vehicles.

In some embodiments, an insulating shell or structure includes an assembly of a floor panel (optionally insulated), one or more insulated right wall panels, one or more insulated left wall panels, one or more insulated front wall panels, one or more insulated rear wall panels, and an insulated ceiling panel, all of which preferably fit together to form a substantially enclosed insulated chamber. The rear wall panel(s) may, for example, have a pre-configured swinging door portion, or may have one or more panel members that are independently movable conforming to the general dimensions of the rear doors of a vehicle. The right and left wall panel(s) may have an opening for a side door to match the size and location of a side door in the vehicle in which the assembly is installed. Depending on the location of the refrigeration unit or condenser in the vehicle, the front wall panel or ceiling panel may have an opening conforming to the air intake and/or output duct, to allow free circulation of cooled air within the insulated chamber. For example, the refrigeration unit may be located on the roof of the vehicle, or on a forward-facing wall thereof.

In some configurations, the insulating shell or structure may be adapted to conform to the upper portions of the wheel wells of the vehicle rear wheels. Multiple panels may be affixed together to form the conforming structural portion, or pre-formed single or multi-panel units may be employed for this purpose.

The panels of the insulating shell or structure may be rigid, semi-rigid or flexible in nature. In one embodiment, a panel suitable for an insulating shell is formed with a soft-sided, flexible fabric skin over a core made of one material, or a sandwich of several materials. Examples of materials usable for the core include, for instance, expanded polypropylene ("EPP"), expanded or extruded polyethylene ("EPE"), or expanded or extruded polystyrene ("EPS"). These materials may be advantageous for the purpose of yielding a light and flexible soft panel core. One type of expanded polypropylene ("EPP") material that may be used in some embodiments is marketed under the trade name PROFLEX13 and manufactured by American Converters ("Amcon"), located in Minneapolis, Minn. PROFLEX13 may have a thermal conductivity k-Value of 0.24, thermal resistance R-Value of 4.2, and a density of 1.3 pounds per cubic foot. One type of extruded polystyrene ("EPS") material that may be used in some embodiments is marketed under the trade name CertiFoam™ and is manufactured by DiversiFoam Products of Rockford, Minn. CertiFoam™ may, for example, have a thermal conductivity k-Value of 0.110 at 40 degrees Fahrenheit.

According to an aspect of one or more embodiments, panels used in an insulated shell or structure may include a flexible fabric skin such as a fabric coated with a vinyl. A vinyl material that may be used for such a purpose is manufactured by USCAN, LLC of Merritt Island, Fla.; an example of such vinyl material is marketed under the trade name or identifier US185-HC. This type of vinyl may be composed of a polyester base fabric with a PVC coating. It may have, for example, a thickness of 0.58 mm, a weight of 630 grams per square meter, and a temperature resistance of −30 to +70 degrees Celsius.

According to one or more embodiments, a method of manufacturing panels as may be used to form an insulating shell or structure may involve the use of a hot melt roll coater and panel laminator to apply adhesive to the inner core (which may be, e.g., foam or other material as previously described) for the adhesion of a vinyl skin, and/or adhesion of additional core pieces for a sandwich construction. Multiple foam boards sandwiched together in such a fashion may provide increased strength or rigidity.

The thickness of panel members used to form an insulating shell or structure may vary. In some implementations, the thickness ranges from 1" to 4", more preferably in the range of 2" to 3".

In some embodiments, the foam core may have perforations to provide some level of flexibility and adaptability. The foam core may, in other embodiments, be reinforced with plastic or other lightweight ribbing, rods or rigid structural members, or with a metal mesh, for example.

A variety of means may be used to attach the panel members together to form an insulated shell or structure. The mechanism for attaching the panel members together is preferably easily reversible, so that the insulated shell or structure can be both rapidly installed and quickly removed for increased flexibility. For example, a panel with a soft core and skin such as described in certain embodiments above, or as otherwise constructed, may be attached using fastening means including, but not limited to, hook-and-loop fasteners such as Velcro®, zippers, snaps, or screws.

The insulating shell or structure may be attached to the vehicle using any of a variety of means. For example, it may be attached by fastening means including, but not limited, snaps, screws, straps, or the like. It may also, in some cases of temporary use, not necessarily be physically attached to the vehicle at all. In some situations, a weighted floor panel may be used to help hold the insulating structure in place.

According to one or more embodiments, the vehicle insulation system may include a solid rear panel connecting the left and right insulating walls, with a swinging door accessible through the rear door(s) of the vehicle. Alternatively, rear insulating panel members may be affixed to each of the rear doors of the vehicle.

In some cases, an insulated shell or structure may be provided in unassembled form as a kit to a vehicle owner or user. The kit may include multiple panels that can be quickly attached and installed in a vehicle. The panels of the kit may be designed to conform to the specific dimensions of a given vehicle. The panels may be assembled outside of the vehicle, in whole or part, and then placed in the vehicle enclosure, or else may be assembled, in whole or part, within the vehicle enclosure.

An embodiment of an insulating shell is illustrated in FIG. 1, which shows a perspective view of components of an insulating liner structure 100, partially assembled. As shown in FIG. 1, the insulating liner structure 100 includes a floor panel member 118 (optionally insulated). Attached the floor panel member 118 in this example is a first wall panel assembly 113 comprising three vertical wall panel members forming the left wall of the insulating liner structure 100, and a second wall panel assembly 114 comprising three vertical wall panel members forming the right wall of the insulating liner structure 100. An insulated front wall panel member 112 may be attached to the floor panel member 118 and to the left and right wall panel assemblies 113, 114 or the frontmost individual members thereof. An insulated rear wall panel 130 may also be attached to the floor panel member 118 and to the left and right wall panel assemblies 113, 114 or the rearmost members thereof. A ceiling panel member 120 may be attached to the various side wall members (i.e., the left and right wall panel assemblies 113, 114, front wall panel member 112, and rear wall panel 130), thereby forming a substantially enclosed insulated chamber.

In this particular example, a pre-configured swinging door portion 131 is provided as part of the rear wall panel 130. This may be useful, for example, for delivery trucks that have a roll-up rear door or the like. In such a case, the rear wall panel 130 may form a bulkhead of sorts, such that when the vehicle door is lifted the rear wall panel 130 independently forms a rear wall of the insulating liner structure 100. Also, in this example, a door-shaped rectangular opening 122 with a door 128 is provided on the right wall assembly 114, optionally allowing access via a side door of the vehicle. The door opening 122 may not be included in other embodiments.

FIG. 2 illustrates another embodiment of an insulating liner structure 200, similar to the insulating liner structure shown in FIG. 1. In FIG. 2, however, rather than a solid rear wall panel, a pair of insulating door members 240, 241 are either swingably attached to the left and right wall assemblies 213, 214 respectively, or else they are attached to the swinging rear doors (not shown) of the vehicle. In the latter case, when the vehicle doors are opened, direct access to the interior chamber of the insulating liner structure 200 would be provided. In other implementations, the pair of insulating door members 240, 241 are swingably attached to the left and right wall assemblies 213, 214 as well as being attached to the swinging rear doors of the vehicle.

In either the embodiments of FIG. 1 or FIG. 2, openings may be provided in various wall or ceiling panels or members for an air refrigeration unit to allow the interior chamber of the insulating liner structure 100 or 200 to be cooled appropriately.

Also, in either the embodiments of FIG. 1 or FIG. 2, the bottom portions of the left and right wall assemblies 113 or 213 and 114 or 214 may be adapted to conform to the shape of the upper wheel wells of the rear wheels of the vehicle by, for example, providing an appropriately shaped cutout in the lower section of the left or right wall assembly and the floor panel member 118 or 218 in the vicinity of the wheel wells and attaching a separate insulated sectional member thereto conforming to the shape of the wheel wells.

In either of the embodiments of FIG. 1 or FIG. 2, the insulating liner structure 100 or portions thereof may be attached to the vehicle by fastening means including, but not limited, snaps, screws, straps, or the like. As previously noted, in cases of temporary use, it need not be physically attached to the vehicle at all. In some situations, the floor panel member 118 or 218 may be weighted to help hold the insulating liner structure 100 or 200 in place.

While in the examples of FIG. 1 and FIG. 2 the left and right wall assemblies are shown with multiple wall panels each, in other embodiments only a single wall panel may be used.

FIG. 3 illustrates a top view of an insulated liner structure 300 similar to that of FIG. 2, showing right and left insulated rear door panels 340, 341 attached to the right and left wall assemblies of the insulated liner structure 300. As noted previously, the right and left insulated rear door panels 340, 341 may optionally be attached to the rear swinging doors of a vehicle. FIG. 3 also shows the right wheel well cover assembly 350 and left wheel well cover assembly 351 that may optionally be utilized as part of the insulated liner structure 300.

FIG. 4 illustrates a top view of another insulated liner structure 400 similar to that of FIG. 1, showing a solid insulated rear panel 430 with a swinging insulated rear door member 431. FIG. 4, like FIG. 3, also shows the right wheel well cover assembly 450 and left wheel well cover assembly 451 that may optionally be utilized as part of the insulated liner structure 400.

Figure 6:
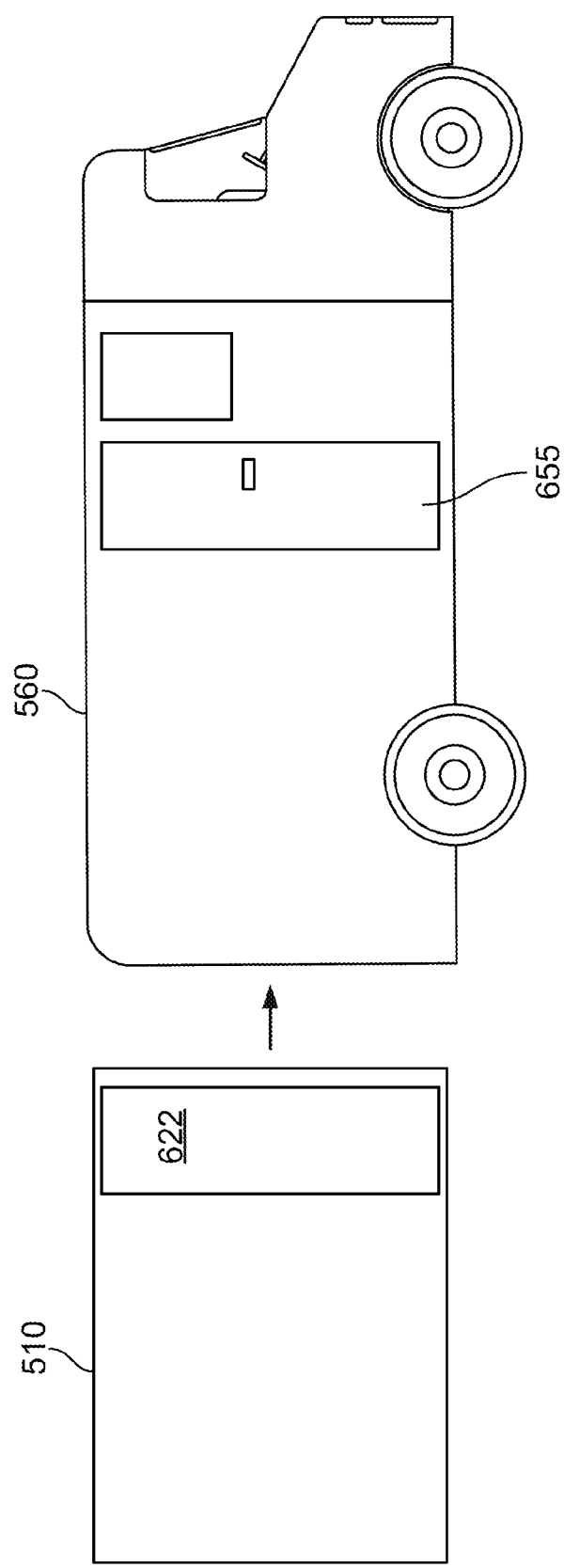

FIG. 5 illustrates, from a top view, installation of an insulated liner structure 510 in a vehicle 560. Installation of the insulated liner structure 510 may in some cases be done after assembly of the structure, and in other cases may be done piecemeal inside the cargo space 565 of the vehicle. In this example, the insulated liner structure 510 may represent any of the embodiments of FIGS. 1 through 4. FIG. 6 illustrates a side view of the same installation process. In addition, FIG. 6 shows the utility of a door opening 622 with respect to a side door 655 of a vehicle, for providing side access to the cooled interior chamber surrounded by the insulated liner structure 510.

Figure 7:
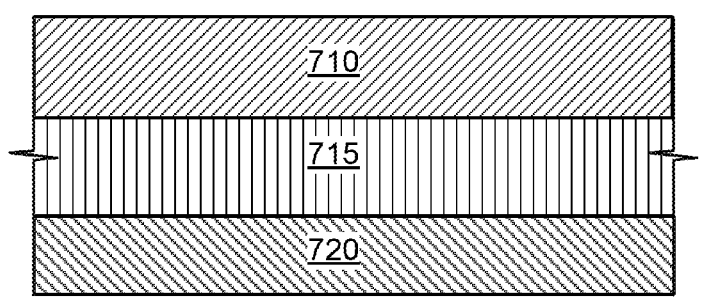
FIG. 7 is a partial cut-away diagram of one possible structure for the interior core of a panel that may be used to form an insulating liner structure.
Figure 8:
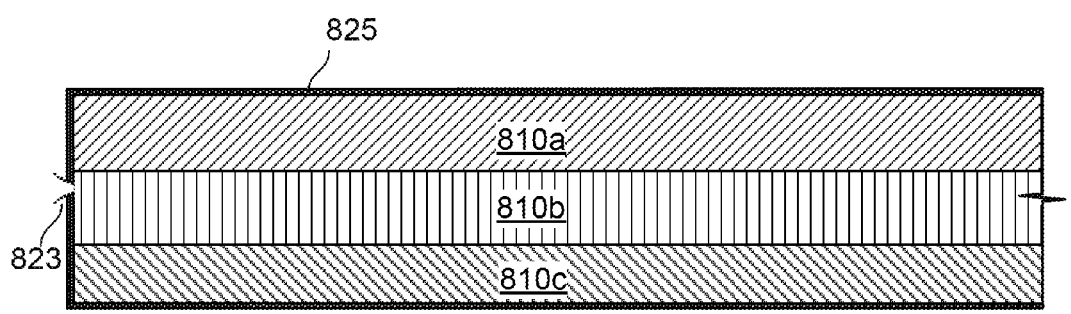
FIG. 8 is a diagram of a panel structure in accordance with one embodiment as disclosed herein, utilizing the core illustrated in FIG. 7.

FIG. 7 illustrates, in partial cut-away, one possible structure for an interior core 700 of a panel that may be used to form an insulating liner structure. As shown in FIG. 7, the interior core 700 comprises, in this case, three individual members 710, 715, 720, which may be made of the same or different materials, and may for instance each be made of a type of material as previously described. The individual members 710, 715 and 720 may be attached together by use of adhesive that may be applied, for instance, by using a hot melt roll coater and/or panel laminator, or other suitable means. FIG. 8 shows the construction of one possible panel structure. In FIG. 8, a panel 800 comprises an inner core 810 (which may be a multi-layer core such as illustrated in FIG. 7, again shown in partial cut-away), covered or surrounded by a flexible fabric skin 823 (which may be made of, e.g., a vinyl material), and is preferably resilient and moisture-resistant. The fabric skin 823 is preferably outfitted with an attachment means such as, in this case, a zipper strip 825 allowing ready fastening of panel members together. A variety of other fastening means may be used as well.

A method of constructing a panel or other wall or outer member of an insulating shell or structure may include providing a lightweight soft core, surrounding or covering the core with a flexible and preferably moisture-resistant skin or covering, and providing a means for attaching the panel or member to other panels or members. According to one technique, the lightweight soft core comprises one or more boards of foam material, which may be sandwiched together and optionally reinforced with additional rigid supporting members, such as rods or frame members. The core may be covered or surrounded with a material such as vinyl, which may be outfitted with straps, hook-and-loop fasteners such as Velcro®, zippers, or other means to attach the panel or member to another panel or member.

A method of constructing an insulating shell or structure may comprise the steps of providing a floor panel or member (optionally insulated), attaching one or more insulated right wall panels to the floor panel or member, attaching one or more insulated left wall panels to the floor panel or member, attaching one or more insulated front wall panels to the floor panel or member and to the right and left wall members adjacent thereto, attaching one or more insulated rear wall panels to the floor panel or member and to the right and left wall members adjacent thereto, and attaching an insulated ceiling panel to the side wall members (right, left, front and back wall panel or members), thereby preferably forming a substantially enclosed insulated chamber. The method may further include providing, for the rear wall panel, a solid rear wall panel with a pre-configured swinging door portion, or else providing one or more panel members that are independently movable conforming to the general dimensions of the rear doors of a vehicle and attached thereto. The method may further include providing openings in various wall or ceiling panels or members for a side door opening, air refrigeration unit, or other features of the vehicle, or to conform the floor and/or left and right wall panel members to the shape of the upper wheel wells of the rear wheels of the vehicle.

A number of implementations have been described. Nevertheless, it will be understood that various modifications may be made without departing from the spirit and scope of the invention. For example, advantageous results may be achieved if the steps of the disclosed techniques were performed in a different sequence, if components in the disclosed systems were combined in a different manner, or if the components were replaced or supplemented by other components. The functions and processes (including algorithms) may be performed in hardware, software, or a combination thereof, and some implementations may be performed on modules or hardware not identical to those described. Accordingly, other implementations are within the scope that may be claimed.

What is claimed is:

1. A method for assembling an insulated enclosure substantially conforming to a cargo area of a vehicle comprising:
   providing a floor unit including one or more floor members, a rear unit including one or more rear members, a front unit including one or more front members, a left side unit including one or more left side members, a right side unit including one or more right side members, and a ceiling unit including one or more ceiling members, wherein the rear unit, the front unit, the left side unit, the right side unit, and the ceiling unit comprise a lightweight flexible foam material;
   constructing a freestanding partial enclosure by:
      (a) releasably and toollessly attaching the left side unit to the rear unit,
      (b) releasably and toollessly attaching the right side unit to the rear unit, and
      (c) releasably and toollessly attaching the ceiling unit to the left side unit, the right side unit, and the rear unit, wherein steps (a) through (c) occur outside the cargo area of the vehicle;
   releasably attaching one or more left side members to the floor unit;
   releasably attaching one or more right side members to the floor unit;
   releasably attaching the front unit to the floor unit, at least one of the one or more right side members, and at least one of the one or more left side members; and
   releasably and toollessly attaching the ceiling unit to at least one of the one or more right side members, at least one of the one or more left side members, and at least one of the one or more front members.

2. The method of claim 1, wherein the lightweight flexible foam material comprises a laminate of a plurality of layers manufactured from one or more of expanded polypropylene ("EPP"), expanded or extruded polyethylene ("EPE"), and expanded or extruded polystyrene ("EPS").

3. The method of claim 1, further comprising connecting a compressor to the insulated enclosure through at least one of the front unit and the ceiling unit.

4. The method of claim 1, wherein releasable and toolless attachment is achieved using one or more of a zipper portion, a snap portion, a hook-and-loop fastener portion, a strap portion, and a tie portion provided at the periphery edges of the one or more front side members, the one or more left side members, the one or more right side members, and the one or more ceiling members.

5. The method of claim 1, further comprising releasably attaching at least one of the one or more left side members, the one or more right side members, or the one or more rear members to a door of the vehicle.

6. The method of claim 1 further comprising:
   releasably attaching a first wheel well panel to at least one of the one or more left side members;
   releasably attaching a second wheel well panel to at least one of the one or more right side members; and
   releasably attaching the first wheel well panel and the second wheel well panel to the floor unit.

7. An insulated liner kit for a vehicle comprising:
   a floor unit including one or more floor panels; and
   at least five insulated panels including a first left side panel, a first right side panel, a first front wall panel, a first rear panel, and a first roof panel, the at least five insulated panels being formed of a lightweight flexible foam and encased in a moisture-resistant fabric, wherein
   the floor unit includes one or more floor unit fasteners for releasable engagement with at least the first left side panel, the first right side panel, and the first front wall panel,
   toolless fasteners are disposed at a plurality of the peripheral edges of the first left side panel, the first right side panel, the first front wall panel, and the first roof panel, wherein the toolless fasteners are configured to releasably mate to complementary toolless fasteners disposed on an adjacent panel,
   the at least five insulated panels and the floor unit assemble to create an insulated chamber substantially conforming to a size and a shape of a cargo area of the vehicle, the insulated chamber capable of being removeably installed within the cargo area of the vehicle, and
   at least one of the first left side panel, the first right side panel, and the rear panel behaves as an access panel, providing access to the insulated chamber through a door of the vehicle.

8. The insulated liner kit of claim 7, wherein at least one of the first front wall panel and the first roof panel includes a compressor opening conforming to a portion of a refrigeration unit.

9. The insulated liner kit of claim 7, wherein the lightweight flexible foam is a laminate of a plurality of layers manufactured from one or more of expanded polypropylene ("EPP"), expanded or extruded polyethylene ("EPE"), and expanded or extruded polystyrene ("EPS").

10. The insulated liner kit of claim 7, wherein the at least five insulated panels further include one or more reinforcement members to provide structural support.

11. The insulated liner kit of claim 7, wherein the floor panel is weighted to maintain a position of the insulating chamber when installed in the cargo area of the vehicle.

12. The insulated liner kit of claim 7, wherein the toolless fasteners include one or more of a zipper portion, a snap portion, a hook-and-loop fastener portion, a strap portion, and a tie portion.

13. The insulated liner kit of claim 7, further comprising one or more wheel well panels, each wheel well panel including one or more wheel well panel fasteners, wherein
   at least one of the first left side panel and the first right side panel is formed to at least partially surround a wheel well of the cargo area of the vehicle, and
   the one or more wheel well panels are releasably attachable to at least one of the first left side panel and the first right side panel.

14. A modular system for reversible conversion to a controlled temperature transport comprising:
   a vehicle including a cab area, a cargo area, and at least one cargo port for access to the cargo area, the cargo area including an interior having a left side wall, a right side wall, a front wall, a rear wall, and a ceiling;
   at least five insulated panels including a left side panel, a right side panel, a top panel, a front panel and a back panel provided to insulate a top and each of four sides of the cargo area of the vehicle, the at least five insulated panels being manufactured from a lightweight flexible foam material surrounded by a fabric layer, toolless connectors at a plurality of peripheral edges of the at least five insulated panels being attachably and detachably mateable to complementary toolless fasteners on adjacent panels; and
   at least one floor panel, wherein
   the left side panel is toollessly attachable to and detachable from the front panel and the top panel, the right side panel is toollessly attachable to and detachable from the front panel and the top panel, the front panel is toollessly attachable to and detachable from the left side panel, the right side panel, and the top panel, and the front panel, the left side panel, the right side panel, the top panel, the back panel, and the floor panel detachably assemble into a shell substantially conforming to a shape and a size of the cargo area of the vehicle, the shell adapted to be partially assembled prior to placement in the cargo area of the vehicle without direct fastening of the shell to the left side wall, the right side wall, the front wall, the rear wall, and the ceiling of the cargo area.

15. The system of claim 14, wherein one or more of the five insulated panels are configured to be detached and replaced after assembly and installation in the cargo area of the vehicle while the remaining insulated panels continue to be assembled as the shell in the cargo area of the vehicle.

16. The system of claim 14, wherein the floor panel comprises insulating material.

17. The system of claim 14, wherein the at least five insulated panels are each between about one inch and about four inches thick.

18. The system of claim 14, wherein the toolless connectors include one or more of a zipper portion, a snap portion, a hook-and-loop fastener portion, a strap portion, and a tie portion.

19. The system of claim 14, wherein the assembled shell is designed to substantially conform to contour dimensions of the cargo area of a particular make and model of vehicle.

20. The system of claim 14, wherein the lightweight flexible foam material is a laminate of a plurality of layers manufactured from one or more of expanded polypropylene ("EPP"), expanded or extruded polyethylene ("EPE"), and expanded or extruded polystyrene ("EPS").

* * * * *